United States Patent
Banham et al.

(10) Patent No.: US 12,292,562 B2
(45) Date of Patent: May 6, 2025

(54) PROCESS FOR MANUFACTURING AN ATHERMAL LOW COST TELESCOPE BASED ON HIGH PRECISION REPLICATION TECHNOLOGY, AND SUCH TELESCOPE

(71) Applicant: MEDIA LARIO S.R.L., Bosisio Parini (IT)

(72) Inventors: Robert David Banham, Suffolk (GB); Giuseppe Valsecchi, Oggiono (IT); Fabio Marioni, Saronno (IT)

(73) Assignee: MEDIA LARIO S.R.L., Bosisio Parini (IT)

( * ) Notice: Subject to any disclaimer, the term of this patent is extended or adjusted under 35 U.S.C. 154(b) by 731 days.

(21) Appl. No.: 17/433,936

(22) PCT Filed: Feb. 17, 2020

(86) PCT No.: PCT/EP2020/054000
§ 371 (c)(1),
(2) Date: Aug. 25, 2021

(87) PCT Pub. No.: WO2020/173728
PCT Pub. Date: Sep. 3, 2020

(65) Prior Publication Data
US 2022/0146809 A1 May 12, 2022

(30) Foreign Application Priority Data

Feb. 27, 2019 (EP) .................................. 19159817

(51) Int. Cl.
*G02B 23/10* (2006.01)
*G02B 5/08* (2006.01)

(52) U.S. Cl.
CPC .......... *G02B 23/10* (2013.01); *G02B 5/0808* (2013.01)

(58) Field of Classification Search
CPC .............................. G02B 5/0808; G02B 23/10
(Continued)

(56) References Cited

U.S. PATENT DOCUMENTS 3,905,778 A * 9/1975 Pearson ................... B32B 3/12
428/116
2006/0061858 A1 * 3/2006 Long .................... G02B 17/026
359/422

OTHER PUBLICATIONS

Written Opinion and International Search Report of PCT/EP2020/054000 mailed May 12, 2020.
(Continued)

*Primary Examiner* — Wyatt A Stoffa
*Assistant Examiner* — Mitchell T Oestreich
(74) *Attorney, Agent, or Firm* — Polsinelli PC

(57) ABSTRACT

A manufacturing method creates a type of telescope which is athermal, lightweight, optical quality for visible and IR applications. The method includes:
a) optical mirrors being made by immersing a master, that is an optical component with a curvature opposite to the mirror required into an electrolytic bath where the applied current transfers metal ions and deposit them on the master, the cathode, as a layer,
b) the layer being bonded by an adhesive, solder or any other attachment process to a mechanical reinforcing structure,
c) after the hardening of the bond or glue, the thin layer being finally released from the master and having maintained the optical quality of the master.

The master or mandrel can be cleaned and reused for repeating this method and manufacturing large series of telescopes.

6 Claims, 2 Drawing Sheets

(58) Field of Classification Search
USPC .......................................................... 359/399
See application file for complete search history.

(56) References Cited

OTHER PUBLICATIONS

Robert Banham, Fabio Marioni, Giovanni Bianucci, Marco Terraneo, Giuseppe Valsecchi, Fabio E. Zocchi, "A new mirror manufacturing technology for free space optical communication," Proc. SPIE 10706, Advances in Optical and Mechanical Technologies for Telescopes and Instrumentation III, 107060E (Jul. 10, 2018).

Fabio Marioni, Zoran Sodnik, Fabio E. Zocchi, "2.5-GB/s free-space optics link over 1.1 km with direct fiber coupling to commercial devices," Proc. SPIE 5550, Free-Space Laser Communications IV, (Oct. 20, 2004).

G. Valsecchi, R. Banham, G. Bianucci, J. Eder, R. Ghislanzoni, A. Ritucci, M. Terraneo, F. E. Zocchi, D. Smith, D. Gale, D. Hughes, "A segmented subreflector with electroformed nickel laminated panels for the Large Millimeter Telescope," Proc. SPIE 9912, Advances in Optical and Mechanical Technologies for Telescopes and Instrumentation II, 99123P (Jul. 22, 2016).

\* cited by examiner

PROCESS FOR MANUFACTURING AN ATHERMAL LOW COST TELESCOPE BASED ON HIGH PRECISION REPLICATION TECHNOLOGY, AND SUCH TELESCOPE

CROSS-REFERENCE TO RELATED APPLICATIONS

This application is a national stage application of International Application Number PCT/EP2020/054000, which was filed on Feb. 17, 2020, which claims priority to European Application Number 19159817.6 filed on Feb. 27, 2019, each of which is incorporated by reference in its entirety.

FIELD

This invention is relative to a manufacturing process for a type of telescope whose innovation is to have simultaneously the following characteristics:
- athermal
- lightweight
- optical quality for visible and IR applications
- low cost
- fast production cycle
- potential for compact system with low F number at no extra cost, the F-number being the ratio of the system's focal length to the diameter of the entrance pupil While telescopes with some but not all of the mentioned characteristics exist and can be designed to meet specific requirement, the proposed telescope fulfills all these aspects all together, making the design and the technology associated to this type of telescopes innovative.

While referring to a design of a specific prototype telescope already produced, the invention covers any possible optical and mechanical design based on the proposed method of production of the optical surface and design of athermal, or non athermal, telescopes based on the specific coupling between the optical surface and the mechanical structure of the telescope.

BACKGROUND

A large range of telescopes exist for many applications: terrestrial telescopes, space telescopes, airborne telescopes, for scientific and military and civilian applications. Their functions are for imaging, detection, LIDAR, data transmission and reception, etc. Each application has specific requirements for which the telescope is designed, mainly driven by optical quality, mass, interface, stability to environmental conditions such as temperature and vibrations. The more stringent the requirement are, generally, the more difficult it becomes to design and build the telescopes, requiring longer manufacturing times and increased costs. No telescopes exist that comprise at the same time all of the following characteristics:
- athermal
- lightweight
- optical quality for visible and IR applications
- low cost
- fast production cycle
- potential for compact system with low F number at no extra cost.

State of the art telescopes can achieve some of the mentioned performances but not all together. A major shortcoming of telescopes with replicated Fresnel lenses is that they do not have good optical quality for visible and IR applications. Furthermore, high quality space telescopes with great stability as far as temperature and vibration concur cost a lot and require very long time and elaborate manufacturing processes. Commercial off the shelf telescopes are not athermal. And aluminum mirrors produced by diamond turning have not enough good optical quality and roughness for application in the visible and near IR wavelengths.

Telescopes with low F number are largely required but often not produced because of their high cost associated with the difficulty in the manufacturing of their high aspherical optical surfaces that requires special polishing machines and a dedicated metrology. In the state of the art, these scientific publications and patent documents are known:

D1 BANHAM ROBERT ET AL: "A new mirror manufacturing technoloy for free space optical communication", PROCEEDINGS OF SPIE; [PROCEEDINGS OF SPIE ISSN 0277-786X VOLUME 10524], SPIE, US, vol. 10706, 10 Jul. 2018 (2018 Jul. 10), pages 107060E-107060E, XP060110315, DOI: 10.1117/12.2312610 ISBN: 978-1-5106-1533-5. This document discloses (see FIG. 2) a method for manufacturing a telescope ("Ritchey-Chrétien telescopes"; section 2) that simultaneously is athermal, lightweight, with a good optical quality for visible and IR applications ("1550 nm"; section 2) and manufacturable at low cost and with a fast Process in high volumes and compact with low F number at no extra cost, wherein a) optical mirrors ("primary mirror", "secondary"; section 2) are being made by immersing a master ("master", section 3), that is an optical component with a curvature opposite to the mirror required, but with the same required optical quality in terms of surface shape and roughness, into an electrolytic bath where the applied current transfers metal ions and deposit them on the master, the cathode ("galvanically laid down"; section 3), so the thin layer of metal ("Nickel"; section 3) deposited on the cathode, whose thickness may range from a few microns to a few mill metres, forms the optical surface of the mirror, b) the layer is being bonded by an adhesive ("adhesive"; section 3), solder or any other attachment process to a mechanical reinforcing structure ("supporting structure"; section 3) c) After the hardening of the bond or glue, the thin layer is finally released from the master ("Only after the latter is completely cured, the mirror is released from the master", section 3) and has maintained the optical quality of the master. This document (see section 5) also discloses the use of an adhesive between the thin layer and the mechanical reinforcing structure and subsequent release from the master for reducing the manufacturing costs.

D2 MARION, F; SODNIK, ZOCCHI, F. E.: "2.5-Gb/s free-space optics link over 1.1 km with direct fiber coupling to commercial devices", SPIE, PO BOX 10 BELLINGHAM WA 98227-0010 USA, vol. 5550 20 Oct. 2004 (2004 Oct. 20), XP040190858, DOI: https://doi.org/10.1117/12.554886. This document discloses (see FIGS. 1 and 3) a lightweight ("1.3 kg"; section 2) telescope for visible and IR applications. The mirrors are manufactured by electroforming a Nickel layer on a gold-coated master and subsequently releasing the gold layer sticking to the Nickel substrate. The mirrors are then attached to a mechanical reinforcing structure (see FIG. 4).

D3 VALSECCHI G ET AL: "A segmented subreflector with electroformed nickel laminated panels for the Large Millimeter Telescope", PROCEEDINGS OF SPIE; [PROCEEDINGS OF SPIE ISSN 0277-786X VOLUME 10524], SPIE, US, vol. 9912, 22 Jul. 2016 (2016 Jul. 22), pages 99123P-99123P, XP060074905, DOI: 10.1117/12.2232390 ISBN:

978-1-5106-1533-5. It does disclose the basic process for manufacturing an athermal telescope. D4 US 3 905 778 A (PEARSON ROBERT C) 16 Sep. 1975 (1975 Sep. 16) discloses a mirror made of a first layer of reflective material forming a flat optical surface, a second layer of adhesive material and a base structure onto which the first layer is attached using the second layer. The adhesive material has as similar thermal expansion coefficient than the base structure and first layer.

OBJECT OF THE INVENTION AND TECHNICAL TASKS TO BE SOLVED

Based on the knowhow of the above disclosures, the object of this invention it to enhance to process so an object such as a mirror or telescope can be produced cheaper, which will allow to even produce disposable telescopes. Thus, it is the main object of the invention, regardless of the application area, to provide a telescope of low cost for the resulting performance simultaneously: The telescope at the end must have these qualities:
- athermal
- lightweight
- optical quality for visible and IR applications
- low cost
- fast production cycle
- potential for compact system with low F number at no extra cost.

THE SOLUTION ACCORDING TO THE INDEPENDENT CLAIMS

The technical tasks are solved by a method for manufacturing a telescope that simultaneously is athermal, lightweight, with a good optical quality for visible and IR applications and manufacturable at low cost and with a fast process in high volumes and compact with low F number at no extra cost, characterized in that
a) optical mirrors are being made by immersing a master, that is an optical component with a curvature opposite to the mirror required, but with the same required optical quality in terms of surface shape and roughness, into an electrolytic bath where the applied current transfers metal ions and deposit them on the master which is made of low expansion material, the cathode, so the thin layer of metal deposited on the cathode, whose thickness may range from a few microns to a few millimetres, forms the optical surface of the mirror,
b) the layer is being bonded by an adhesive, solder or any other attachment process to a mechanical reinforcing structure is likewise made of Carbon Fibre Reinforced Polymers (CFRP), Silicon-Carbide (SiC) or Carbon-fiber reinforced silicon carbide or of a combination of these materials,
c) After the hardening of the bond or glue, the thin layer is finally released from the master and has maintained the optical quality of the master.

The use of these specific materials both for the mirrors and for the mechanical structure proves to be crucial and makes the telescope athermal and lightweight. These materials can be further easily machined. The use of a precise replication technology to shorten the manufacturing time of the optics makes the telescope low cost and allows the possibility of high volume production due to the short time production process. The telescope comprises an adhesive to bond a thin Nickel layer to the mechanical reinforcing structure and the entire telescope will be athermal. The adhesive compensates the irregularities/roughness of the mechanical reinforcing structure and thus the surface of the mechanical reinforcing structure needs to be less accurate. Such telescope is not sensitive to temperature fluctuations. Manufacturing cost are substantially reduced and the accuracy and precision of-the telescope is at the same time improved The telescope according to the manufacturing process of this invention does not have any of the mentioned shortcomings while it comprises all the mentioned characteristics all together making it a good solution for many optical applications. And the proposed mirror manufacturing technology based on replication overcomes the cost problem by decreases greatly the costs and the production time when many identical telescopes are required.

BRIEF DESCRIPTION OF THE DRAWINGS

The invention will be disclosed and explained referring to the figures which show examples of executions. They show.

DETAILED DESCRIPTION

Figure 1:
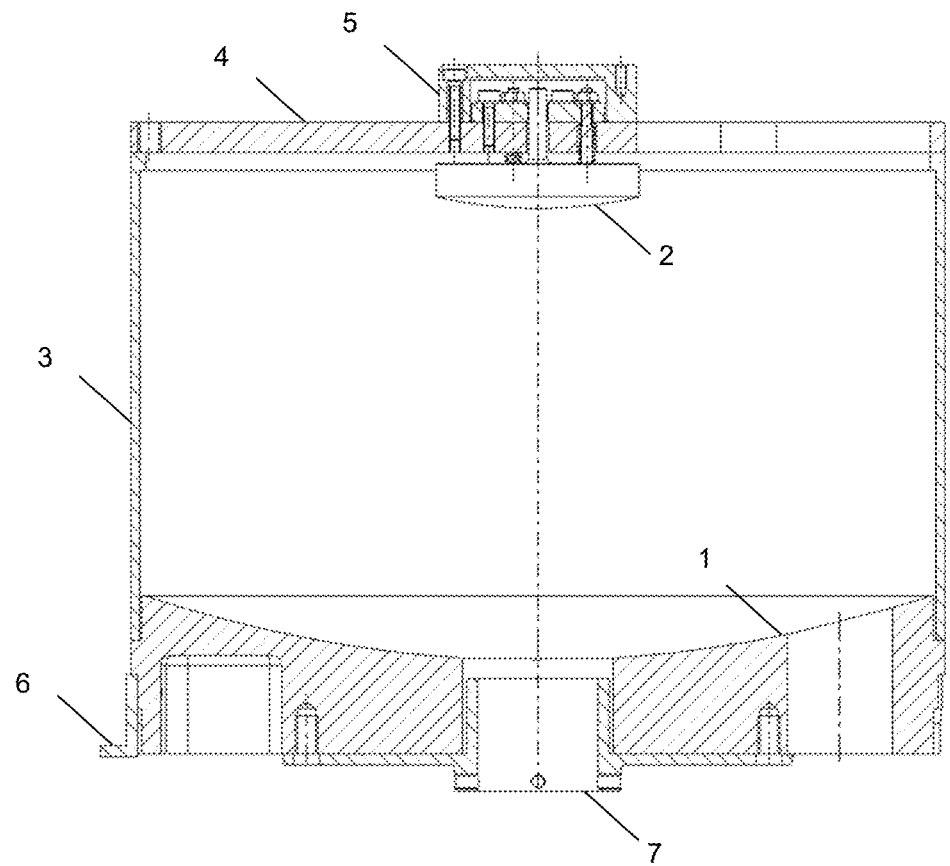
FIG. 1: A backing structure that provides structural stability to the mirror.

This telescope is based on optical surfaces that are produced by replication technology from precise optical masters whose shape is opposite in curvature with regard to the desired mirror. The concept is to have as many as required or as few as just one optical master, where maximum effort and resources can be allocated to reach a very good optical quality, from which many mirrors can be replicated. The masters can be produced in glass, ceramic, plastic, metal or any other material and can be as thick and heavy as required to facilitate the fabrication process. The replication technology, that in this case is a deposition of a thin layer of metal but could be any layer deposited by a coating process is being transferred directly to the telescope structural component thereby producing an essentially finished telescope.

The structure is made of either Carbon Fibre Reinforced Polymers (CFRP), Silicon-Carbide (SiC) or Carbon-fiber reinforced Silicon Carbide (CeSiC®) which consists of a matrix of Silicon Carbide (SiC) reinforced with microscopic carbon fibers of various compositions and lengths. This material is characterized by exceptional hardness and stiffness, high thermal conductivity, a low coefficient of thermal expansion down to cryogenic temperatures, and a relatively high fracture toughness (due to the C-fibers). Furthermore, the manufacture of CeSiC components is quick and cost-competitive, and can be adapted to designs of virtually any complexity. Additionally, the backing structure can be made lightweight by machining it in a conventional machine shop and relatively cheap because there are no demanding requirements for the precision of the backing structure since the imperfections of manufacturing of the backing structure are compensated by the bonding layer that fills the gap between it and the optical surface layer. This backing structure can also be made of materials with different coefficient of thermal expansion (CTE) with respect to the electroformed layer. The bonding material, then generally softer, can absorb the differentials.

The direct producing of an essentially conventional design telescope mirror with the mentioned characteristics is but one possibility when the mirrors subsequently can be integrated in the telescope. The telescope structure will be designed so that all the mechanical parts are made with the same metal, e.g. aluminium-alloy, used for the backing structure. The alternative is to carry out this process on a completed telescope structure eliminating the assembly and integration process, further reducing costs.

In case of optical systems, it is usually very expensive to produce the optical surface of the mirrors because of the elaborate efforts for obtaining a good quality of the mirror. The here proposed technology allows to greatly reduce these costs since the efforts are only necessary for the master which is then used to produce many mirrors, even in numbers greater than one hundred. Further, the use of the backing structure, in particular of a lightweight backing structure, allows to produce a mirror more lightweight than a conventional mirror since less structural requirements are given for the backing structure in respect to a mirror that is ground and polished directly. As a consequence and benefit, very complex optical systems to form very compact lightweight, athermal telescopes can be designed and produced at low cost.

The telescope as shown in FIG. 1 is designed so that all the mechanical parts are made with the same metal, comprising:
the primary mirror 1
the secondary mirror 2
the optical tube 3
the supports of the secondary mirror 4
the alignment system for the secondary mirror 5
the interface for their installation 6
the supports for the focal plane instrumentation 7.

A telescope so made is insensitive to change of temperature. The use of low density alloy allows to design a very lightweight telescope. The use of all metal parts allows to machine any component as desired without restrictions being a metal easily machinable so to minimise the mass in respect to the mechanical stability. Finally, the proposed manufacturing process for the optical parts allows to have mirrors of the same metal used for the other components of the telescope which is usually impossible when low cost direct polishing of aluminium mirrors is considered or when the mirrors are made in standard glass or ceramic. The alternative is to carry out this process on a completed telescope structure eliminating the assembly and integration process, at a very high cost.

Figure 2:
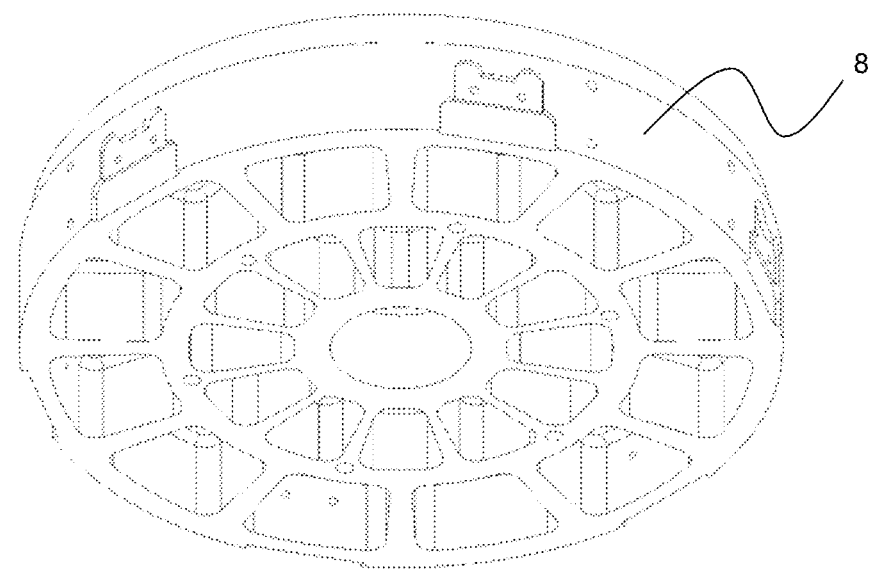
FIG. 2: A telescope, in this case a Ritchey-Chretien reflector with a diameter of 200 mm and a focal length of 500 mm that comprises a primary mirror and a secondary mirror, both produced with the proposed technology, and with an athermal design.

FIG. 2 shows a telescope, in this case a Ritchey-Chretien reflector, with a diameter of 200 mm and a focal length of 500 mm that comprises a primary mirror and a secondary mirror, both produced with the proposed technology, and with an athermal design. The use of such a backing structure 8 as shown in FIG. 2 enables to make it lightweight. And consequently it allows to produce a mirror more lightweight than a conventional mirror since less structural requirements are needed for the backing structure 8 in respect to a mirror that is ground and polished directly. In this case therefore, very complex optical systems to form very compact lightweight telescopes as shown in FIG. 1 can be designed and produced at low cost, being then also possible to design optical system with high aspherical mirrors.

Figure 3:
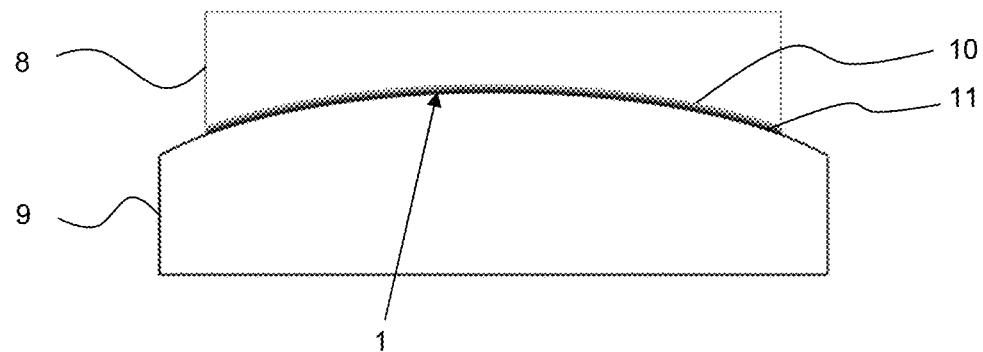
FIG. 3: An optical master for a primary mirror of a telescope used to form the thin layer of Nickel with the mirror on top of it during its manufacturing through replication.
Figure 4:
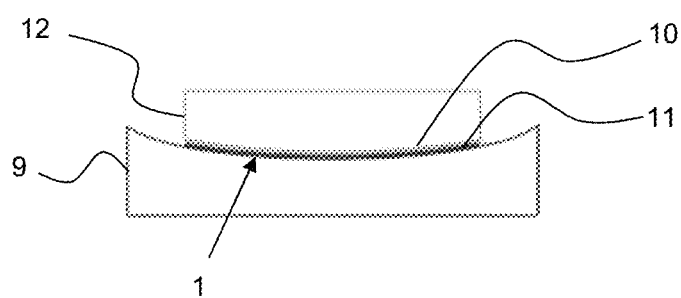
FIG. 4: An optical master for a secondary mirror of a telescope used to form the thin layer of Nickel with the mirror on top of it during its manufacturing through replication.

The production of the optical mirrors is explained in more detail in view of FIGS. 3 and 4. An optical component with a curvature opposite to the mirror required but with the same required optical quality in term of surface shape and roughness is put into an electrolytic bath where the applied current transfers metal ions and deposit them on the master, the cathode. The thin layer of metal deposited on the cathode, e.g. a nickel layer 11 whose thickness may range from a few microns to a few millimetres, becomes the optical surface of the mirror 1. Before removing it from the master or mandrel 9, the thin layer is bonded by an adhesive or glue 10, solder or any other attachment process to a mechanical reinforcing structure 8. Such adhesive material 10 can e.g. be Indium or any other low melting alloy. After the hardening of the bond, the thin layer 11 is finally released from the master or mandrel 9. It has maintained the optical quality of the master 9. The master 9 can be then cleaned and re-used to produce another mirror.

The same principle does apply for manufacturing a secondary mirror as shown in FIG. 4. The thin layer 11 on the mandrel 9 is glued to the backing structure 12 for said secondary mirror 2.

Figure 5:
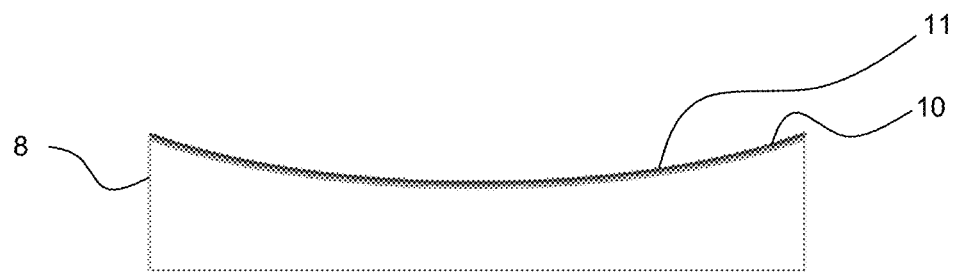
FIG. 5: A primary mirror.
Figure 6:
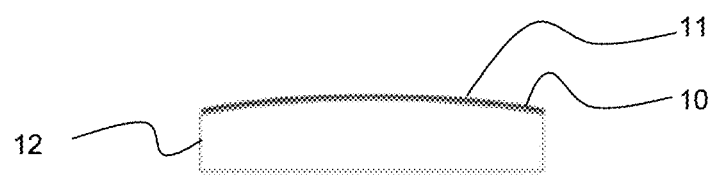
FIG. 6: A secondary mirror.

Given the short time to deposit the thin layer 11 and to bond it to the backing structure 8, 12, this process is fast, and it allows the production of quality large optical mirrors as shown in FIGS. 5 and 6, making it therefore also cost effective. Additionally, mirrors characterised by low F number and great asphericity, usually very expensive, can be replicated in a very short time and a very low cost since the cost is mainly the one of the master and therefore diluted when a great number of mirrors are produced by the same master.

As said the backing structure 8, 12 for the mirrors can be made in any suitable material to perfectly match the coefficient of thermal expansion of the metallic layer 11 so that any change of temperature will not deform the mirror. Additionally, the backing structure 8 as shown in FIG. 2 in an example can be made lightweight by machining it in a conventional machine shop and relatively cheap because there are no demanding requirements for the precision of the backing structure since the imperfections of manufacturing of the backing structure are compensated by the bonding layer that fills the gap between it and the optical surface layer.

LIST OF NUMERALS 1 primary mirror
2 secondary mirror
3 optical tube
4 supports of the secondary mirror
5 alignment system for the secondary mirror
6 interface for their installation
7 supports for the focal plane instrumentation
8 backing structure of primary mirror 1
9 master, mandrel
10 glue
11 nickel layer
12 backing structure of secondary mirror 2
13 mandrel to backing structure 12
14 backing structure of primary mirror 1

The invention claimed is:

1. A method for manufacturing a telescope, the method comprising:
   a) making optical mirrors including a primary mirror and a secondary mirror by immersing a master, that is an optical component with a curvature opposite to the mirror required, but with the same required optical quality, into an electrolytic bath where the applied current transfers metal ions and deposit them on the master, that includes the cathode, and which is made of a material including glass, ceramic, plastic, and/or metal, so a layer of a material with different coefficient of thermal expansion (CTE) than a mechanical reinforcing structure is deposited on the cathode by using an adhesive to absorb differences in expansion between the mechanical reinforcing structure and the layer, whereby a thickness of the layer forms the optical surface of the mirror,
   b) bonding the layer by an attachment process to a mechanical reinforcing structure which is made of material including Carbon Fiber Reinforced Polymers (CFRP), Silicon-Carbide (SiC) or Carbon-fiber reinforced silicon carbide, or a combination thereof
   c) after the hardening of the bond or glue, releasing the layer from the master while maintaining the optical quality of the master.

2. The method for manufacturing a telescope according to claim 1, wherein the layer and the mechanical reinforcing structure have an equal coefficient of thermal expansion (CTE).

3. A telescope made by the method according to claim 1, wherein backing structures for the primary mirror and the secondary mirror are made of an aluminum-alloy, Carbon Fibre Reinforced Polymers (CFRP), Silicon-Carbide (SiC), Carbon-fiber reinforced silicon carbide or a combination of these materials.

4. A telescope made by the method according to claim 1, wherein the mechanical reinforcing structure and backing structures for the primary mirror and the secondary mirror have an equal coefficient of thermal expansion (CTE).

5. A telescope made by the method according to claim 1, wherein backing structures for the primary mirror and the secondary mirror are each made of a material with different coefficient of thermal expansion (CTE) than the mechanical reinforcing structure, and with an elastic adhesive for absorbing different expansions of the materials of the primary mirror and the second mirror.

6. An optical system made by the method according to claim 1, that includes a construction method.

* * * * *